United States Patent [19]

Johnson et al.

[11] Patent Number: 5,612,944
[45] Date of Patent: Mar. 18, 1997

[54] DISC TRANSPORT APPARATUS

[75] Inventors: Dean A. Johnson, Churchville; James M. Gotta, Fairport; Stephen A. Horstman, Rochester, all of N.Y.

[73] Assignee: Eastman Kodak Company, Rochester, N.Y.

[21] Appl. No.: 392,277

[22] Filed: Feb. 22, 1995

Related U.S. Application Data

[63] Continuation of Ser. No. 123,509, Sep. 20, 1993, abandoned.

[51] Int. Cl.$^6$ .................................................. G11B 17/10
[52] U.S. Cl. ............................................................ 369/191
[58] Field of Search ................................ 414/728, 729, 414/738, 739, 741, 751, 753, 932; 369/34, 36, 38, 39, 178, 191–194; 360/92; 294/116; 364/478, 479

[56] References Cited

U.S. PATENT DOCUMENTS

| | | |
|---|---|---|
| 1,362,286 | 12/1920 | Gerhardt . |
| 1,471,799 | 10/1923 | Morrell . |
| 1,979,276 | 11/1934 | Mann . |
| 2,068,449 | 1/1937 | Downs . |
| 2,379,060 | 6/1945 | Bacheldor . |
| 3,315,840 | 4/1967 | Tollkuhn . |
| 3,715,040 | 2/1973 | Polus et al. .......................... 294/93 X |
| 3,719,110 | 3/1973 | LaPointe ................................... 81/116 |
| 3,789,160 | 1/1974 | Bruer et al. ............................. 179/100 |
| 3,976,300 | 8/1976 | Bruer ......................................... 274/1 |
| 4,007,535 | 2/1977 | Brandt et al. ............................ 29/261 |
| 4,314,524 | 2/1982 | Deguchi .................................. 118/54 |
| 4,340,249 | 7/1982 | Bucklew ................................... 294/95 |
| 4,340,952 | 7/1982 | Ikedo ........................................ 369/77 |
| 4,395,069 | 7/1983 | Lebret ............................... 294/116 X |
| 4,492,400 | 1/1985 | Yuda ......................................... 294/88 |
| 4,579,380 | 4/1986 | Zaremsky et al. ..................... 294/119 |
| 4,589,817 | 5/1986 | Adinolfi et al. ........................ 414/729 |
| 4,595,221 | 6/1986 | de Geus et al. ......................... 294/16 |
| 4,645,220 | 2/1987 | Hiestand ................................. 279/111 |
| 4,667,998 | 5/1987 | Borcea et al. ............................ 294/88 |
| 4,682,805 | 7/1987 | Reynolds ................................. 294/86 |
| 4,726,615 | 2/1988 | Goldberg ................................. 294/16 |
| 4,805,951 | 2/1989 | Andersson et al. .................... 294/116 |
| 4,918,991 | 4/1990 | Bucher et al. ........................... 73/864 |
| 5,054,836 | 10/1991 | Schulz .................................... 294/116 |
| 5,187,695 | 2/1993 | Schindler et al. ....................... 369/37 |
| 5,195,794 | 3/1993 | Hummell, Jr. et al. ................. 294/94 |

FOREIGN PATENT DOCUMENTS 4-40665   2/1992   Japan ......................................... 360/92

Primary Examiner—Stuart S. Levy
Assistant Examiner—William J. Klimowicz
Attorney, Agent, or Firm—James D. Leimbach

[57] ABSTRACT

A transport apparatus for reliably handling compact discs includes a jaw assembly having a lower pivot plate coupled to an upper frame member, at least three jaw blades pivotally mounted in openings located in the lower pivot plate, wherein lower portions of the jaw blades extend from the lower pivot plate and upper portions of the jaw blades extend through openings provided in the upper frame member, a mechanism for applying an outward pivoting force to the jaw blades, and a mechanism for applying an inward pivoting force. In addition to pivoting, the jaw blades can move upward in response to a force exerted against the tips of the jaw blades.

17 Claims, 10 Drawing Sheets

DISC TRANSPORT APPARATUS

This is a Continuation of application Ser. No. 08/123,509, filed Sep. 20, 1993, now abandoned.

FIELD OF THE INVENTION

The invention relates in general to apparatus for handling information storage discs. More specifically, the invention relates to a disc transport apparatus for loading optical information storage discs into or out of a disc writer unit.

BACKGROUND OF THE INVENTION optical information storage discs, commonly referred to as "compact discs" or "CD's", have become a popular medium for storing information. In the music recording industry, for example, digital audio compact discs have rendered conventional phonograph records obsolete, due in part to the inherent capability of compact disc technology to reproduce the information recorded on the compact disc without causing physical degradation or wear to the disc surface. Thus, the music played from a compact disc is always free from the noise and distortion associated with the playing of conventional phonograph records or magnetic tapes having worn recording surfaces. Another advantage of compacts discs are their ability to store large amounts of digitized information in a relatively small amount of space, which makes the discs ideal for multimedia applications in which it is desirable to store large amounts of text, audio and image data together on a single disc. Many reference materials, for example encyclopedias, are now produced in multimedia format on compact discs. The compact discs also offer the ability to quickly and randomly access any portion of stored data, and are therefore extremely useful in archive applications. Systems have recently been introduced, for example, in which photographic images are digitized and archived on compact discs for subsequent retrieval and display.

The popularity of compact discs has led to the need for CD writing units that are capable of quickly producing large numbers of CDs to meet market demands. An example of a CD writing unit is the Kodak PCD Writer 200 marketed by the Eastman Kodak Company of Rochester, N.Y. In operation, a blank CD is manually placed in a drawer mechanism that extends from the CD writing unit. The drawer mechanism is then closed and a write operation is performed. The recorded CD must then be manually retrieved from the drawer mechanism. While it is possible to increase CD recording production by improving the speed at which the CD writing unit operates, the requirement for the manual loading of the CD's into and out of the CD writing unit reduces the efficiency of the operation and adds expense, as an operator must be dedicated to the task of loading and unloading CD's. Accordingly, it would be desirable to provide an apparatus capable of automatically transporting and loading the CD's to and from the write drawer.

In view of the above, it is an object of the invention to provide an automatic disc transport apparatus for reliably and automatically handling the movement and loading of compact discs into and out of a CD writing unit.

SUMMARY OF THE INVENTION

The invention provides a transport apparatus for reliably handling compact discs. The mechanism includes a jaw assembly having a lower pivot plate coupled to an upper frame member, at least three jaw blades pivotally mounted in openings located in the lower pivot plate, wherein lower portions of the jaw blades extend from the lower pivot plate and upper portions of the jaw blades extend through openings provided in the upper frame member, a mechanism for applying an outward pivoting force to the jaw blades, and a mechanism for applying an inward pivoting force.

The mechanism for applying the outward pivoting force preferably includes a main spring located between the jaw blades and the upper frame member and a spring cap located between the main spring and the jaw blades. The spring cap contacts a spring cap face located on the jaw blades causing the blades to pivot.

The mechanism for applying an inward pivoting force preferably includes a stripper plate having at least three rollers, each roller being located in a slot opening, wherein the upper portions of each jaw blade are located within a slot opening, and the roller of each slot opening fits within a roller slot located in the upper portion of the jaw blade located in the slot opening. A stripper plate spring located between a top surface of the upper frame member and a bottom surface of the stripper plate to apply an upward force to the stripper plate.

The above described jaw assembly is readily incorporated in a transport apparatus for loading and unloading CD's from a write unit that includes an input magazine retainer, a plunger assembly located adjacent to the input magazine retainer, an output magazine retainer located adjacent to the plunger assembly, an elevator assembly located adjacent to the input magazine retainer, a carriage assembly located above the input magazine retainer, the plunger assembly and the output magazine retainer, and a controller for controlling the operation of the plunger assembly, the elevator assembly and the carriage assembly.

A particular advantage of the jaw assembly structure is that the jaw blades thereof can "float" to accommodate any misalignment of CD's that are to be handled. Specifically, the jaw blades can move upward as well as pivot.

BRIEF DESCRIPTION OF THE DRAWINGS

The invention will be described in greater detail with reference to the accompany drawings, wherein.

DETAILED DESCRIPTION OF THE PREFERRED EMBODIMENTS

Figure 1:
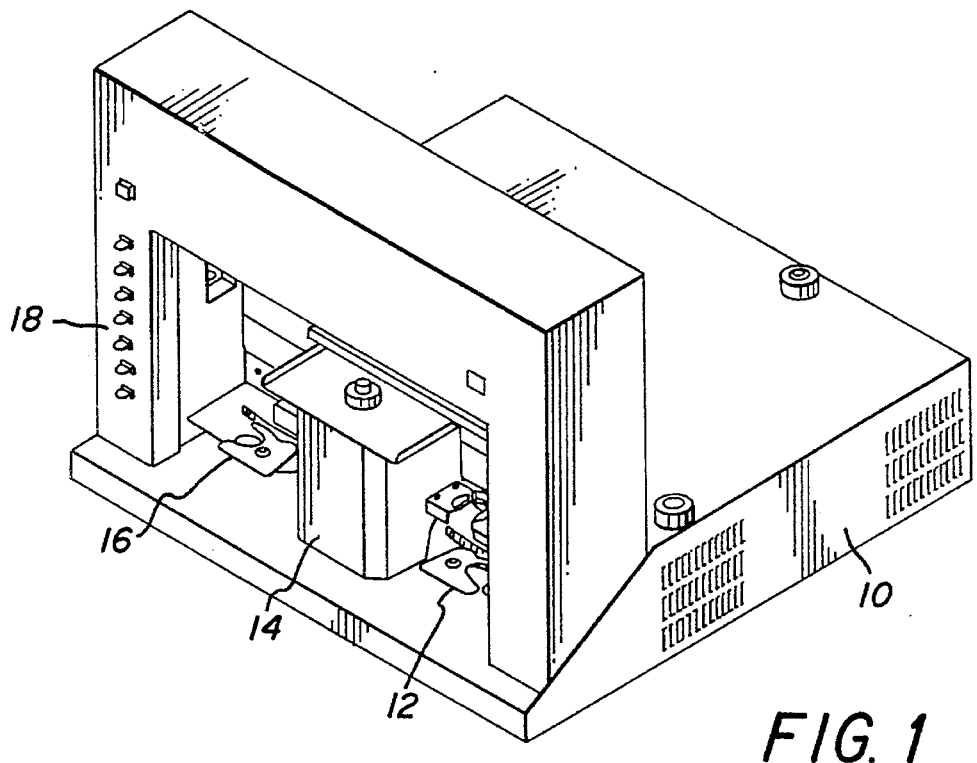
FIG. 1 is a perspective view of a compact disc transport apparatus in accordance with the invention.
Figure 2:
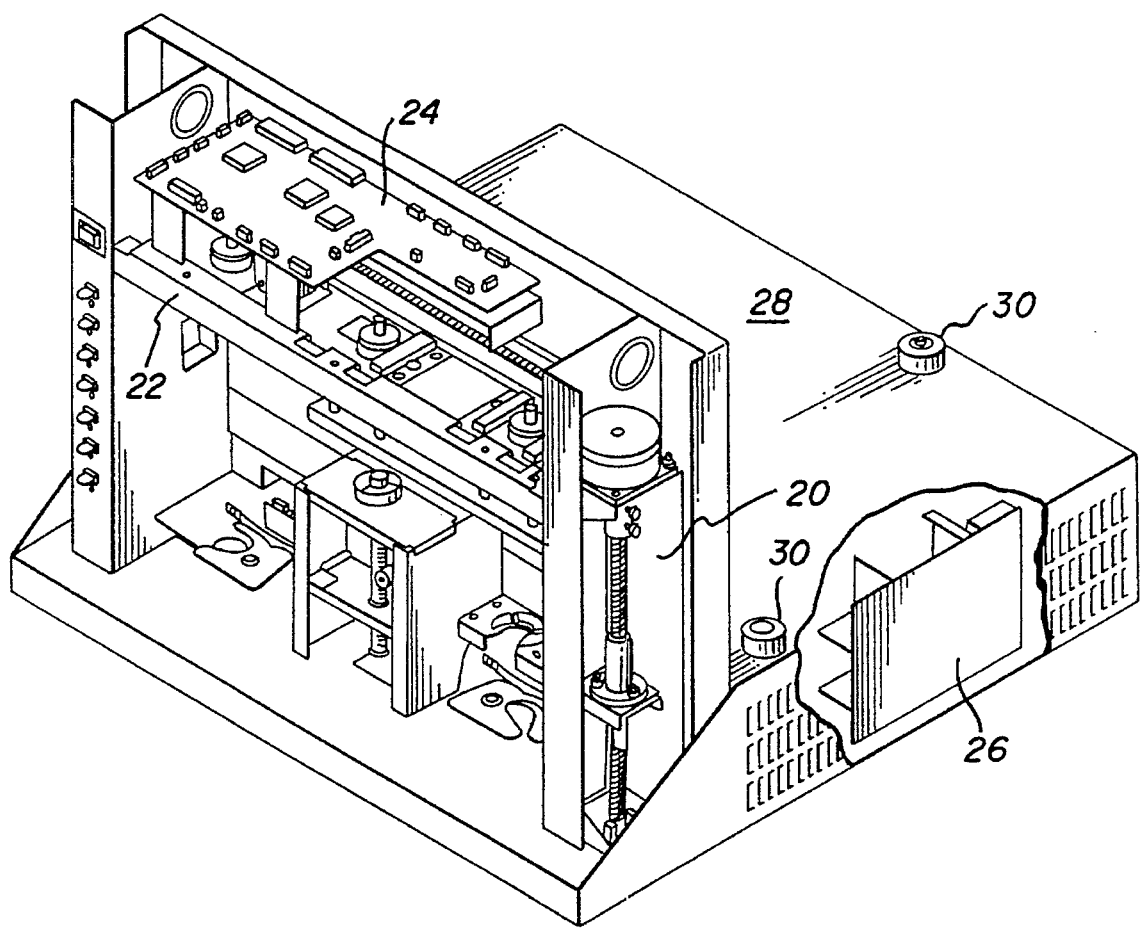
FIG. 2 illustrates the compact disc transport apparatus shown in FIG. 1 with cover panels removed.

The invention will now be described with reference to FIGS. 1 and 2, wherein FIG. 1 is a perspective view of a compact disc transport apparatus in accordance with the invention and FIG. 2 illustrates the compact disc transport apparatus with cover panels removed. The compact disc transport apparatus includes a base unit 10, an input magazine retainer 12, a plunger assembly 14, an output magazine retainer 16 and an operator interface panel 18. A shown in FIG. 2, an elevator assembly 20 is located adjacent to the input magazine retainer 12 and a carriage assembly 22 is located above the input and output magazine retainers 12, 16 and the plunger assembly 14. An electronic controller assembly 24 is preferably located over the carriage assembly 22 as shown, although it could also be readily located within the base unit 10. The base unit 10 includes a power supply 26 and a top surface 28 on which alignment pins 30 are located.

Figure 3:
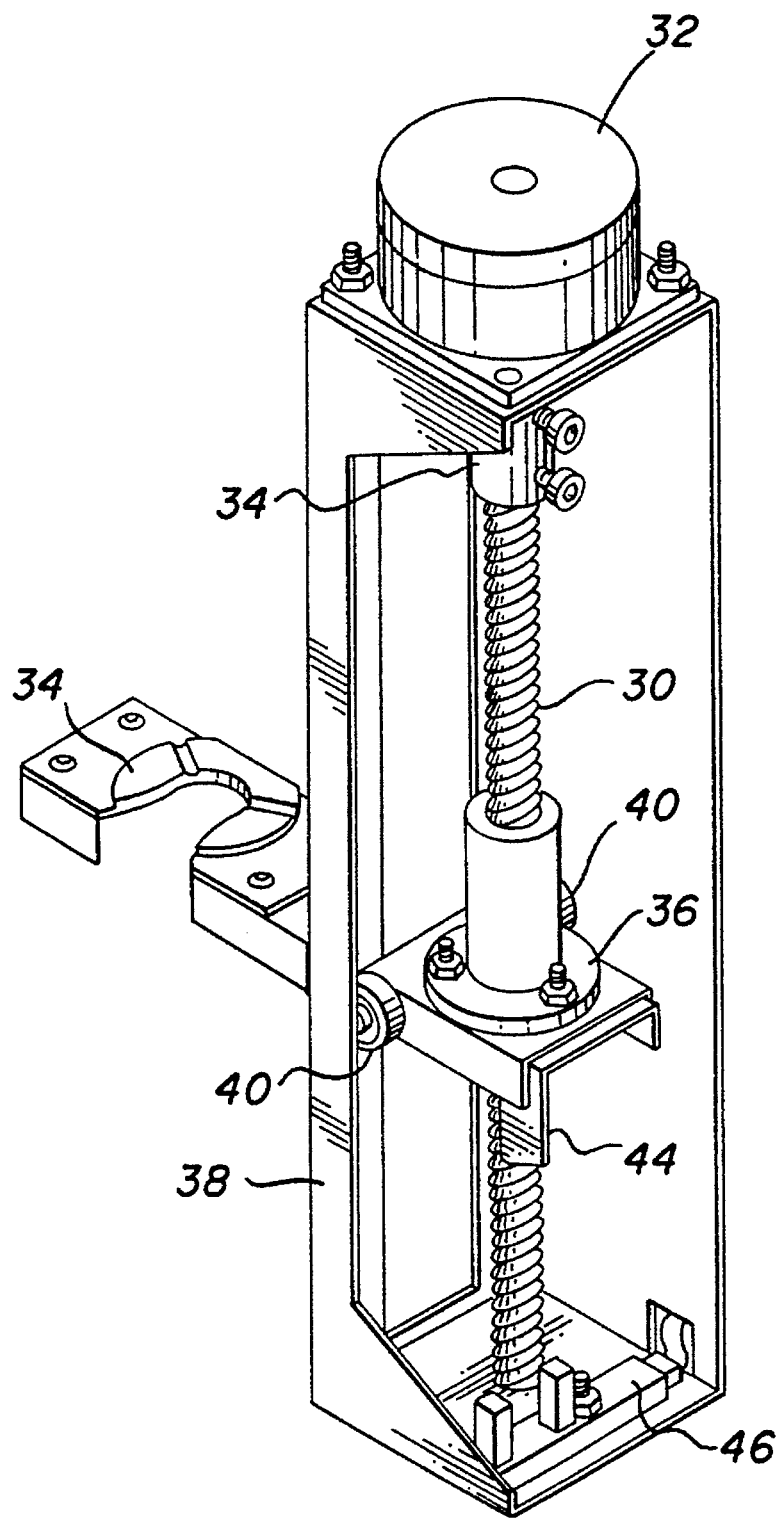
FIG. 3 is a detailed assembly drawing of the elevator assembly illustrated in FIG. 2.

The elevator assembly 20 includes a lead screw 30 that is attached to a stepper motor 32 via a coupling 34 as shown in FIG. 3. The stepper motor 32 is used to drive a lift arm 34 that is movably attached to the lead screw 30 by a bearing assembly 36. The lift arm 34 is located or registered against a frame member 38 of the elevator assembly 20 by a pair of pulleys or wheels 40 mounted on opposite sides of the lift arm 34. An elevator home optical sensor 46 is also mounted to the frame member 38 and coupled to the electronic controller assembly 24. An elevator home flag 44, located on a rear portion of the lift arm 34, breaks the optical beam of the elevator home optical sensor 46 when the lift arm 34 is lowered to its lowest operating or "home" position, thereby causing a signal to be sent to the electronic controller assembly 24 indicating that the lift arm 34 is positioned at the home position.

Figure 4:
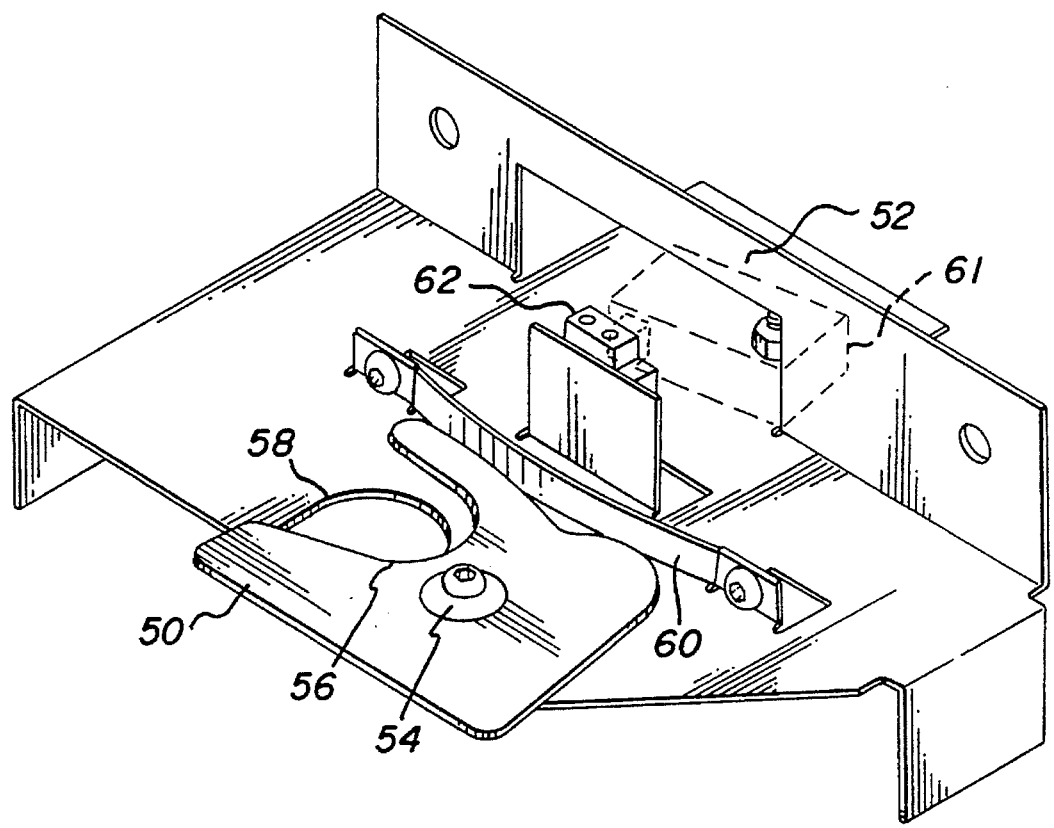
FIG. 4 is a detailed assembly drawing of the input and output magazine retainers illustrated in FIG. 1.

The input and output magazine retainers 12, 16 are essentially "mirror" images of each other. As shown in FIG. 4, each magazine retainer includes a locator clamp 50 attached to a magazine frame member 52 by a fastener 54. The locator clamp 50 has a recess or opening 56 that aligns with a corresponding recess 58 formed in the magazine frame member 52 when the locator clamp 50 is turned to the illustrated locked position. A leaf spring 60 is provided to apply a retaining force to the locator clamp 50 in the locked position. A micro switch 61 attached to the bottom of the frame member 52 (shown in phantom) is used to detect the presence of a magazine within the magazine retainer, by making contact with a base portion of the magazine which slides under the frame member 52 as will be described in greater detail below. The output magazine retainer 16 also preferably includes an optical magazine empty sensor 62 fixed to the magazine frame member 52, which sends a signal to the electronic controller assembly 24 that is indicative of whether a magazine loaded within the output magazine retainer 16 is empty.

Figure 5:
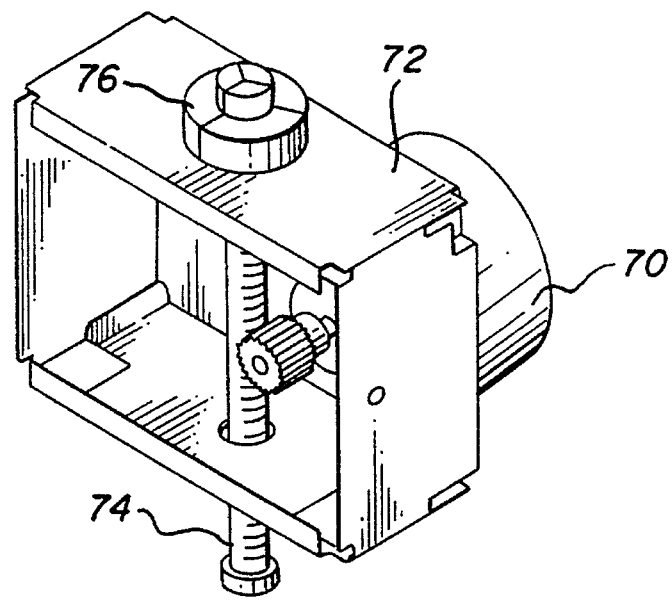
FIG. 5 is a detailed assembly drawing of the plunger assembly illustrated in FIG. 1.

The plunger assembly 14 includes a plunger stepper motor 70 coupled to a plunger assembly frame 72 as shown in FIG. 5. The plunger stepper motor 70 drives a rack assembly 74 in response to command signals received from the electronic controller assembly 24. A circular disc locator 76 is attached to one end of the rack assembly 74.

Figure 6:
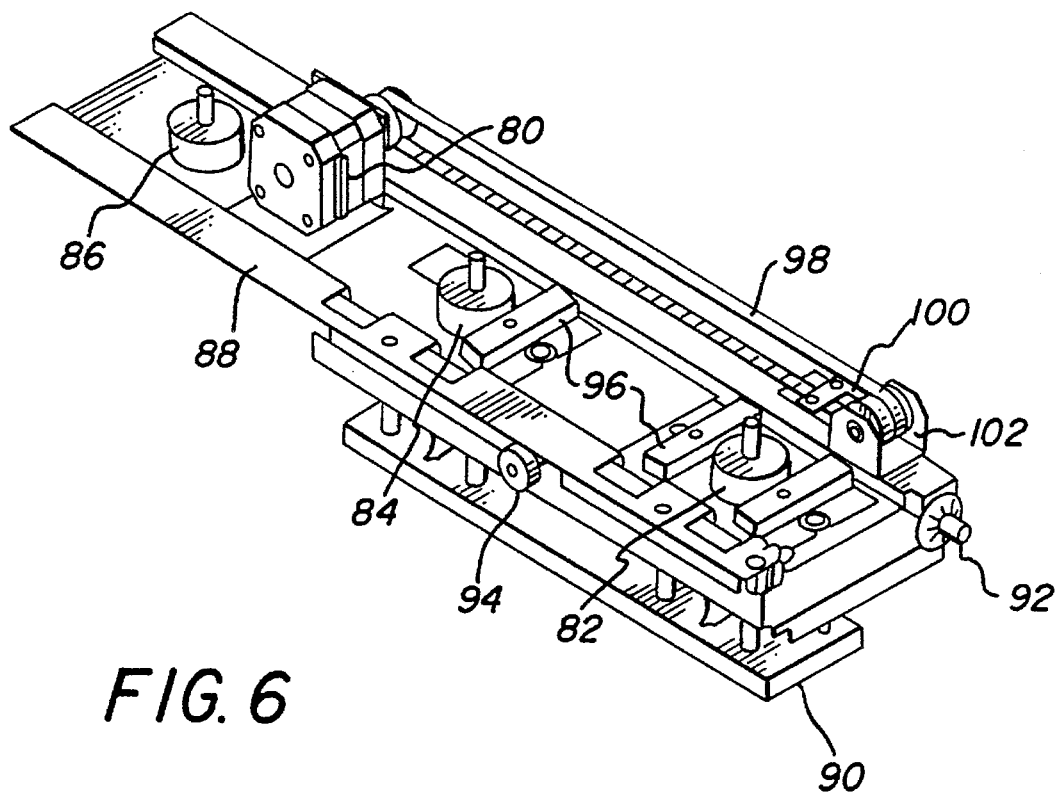
FIG. 6 is a detailed assembly drawing of the carriage assembly illustrated in FIG. 2.

The carriage assembly 22 is illustrated in greater detail in FIG. 6. The carriage assembly 22 includes a carriage drive stepper motor 80, an input station solenoid 82, a plunger station solenoid 84, and an output station solenoid 86 coupled to a carriage assembly frame member 88. A movable transport carriage 90 is attached to a guide rod 92 that extends along the length of the carriage assembly frame member 88. A guide roller 94, which registers against a surface of the carriage assembly frame member 88, is provided on the front of the movable transport carriage 90. Sensor housings 96 are also provided adjacent to the input station solenoid 82 and the plunger station solenoid 84. The movable transport carriage 90 is transported along the guide rod 92, as the carriage drive stepper motor 80 drives a drive belt 98 that rotates about a pulley 102 (fixed to the carriage assembly frame member 88) and is secured to the transport carriage 90 by a belt retainer 100.

Figure 7:
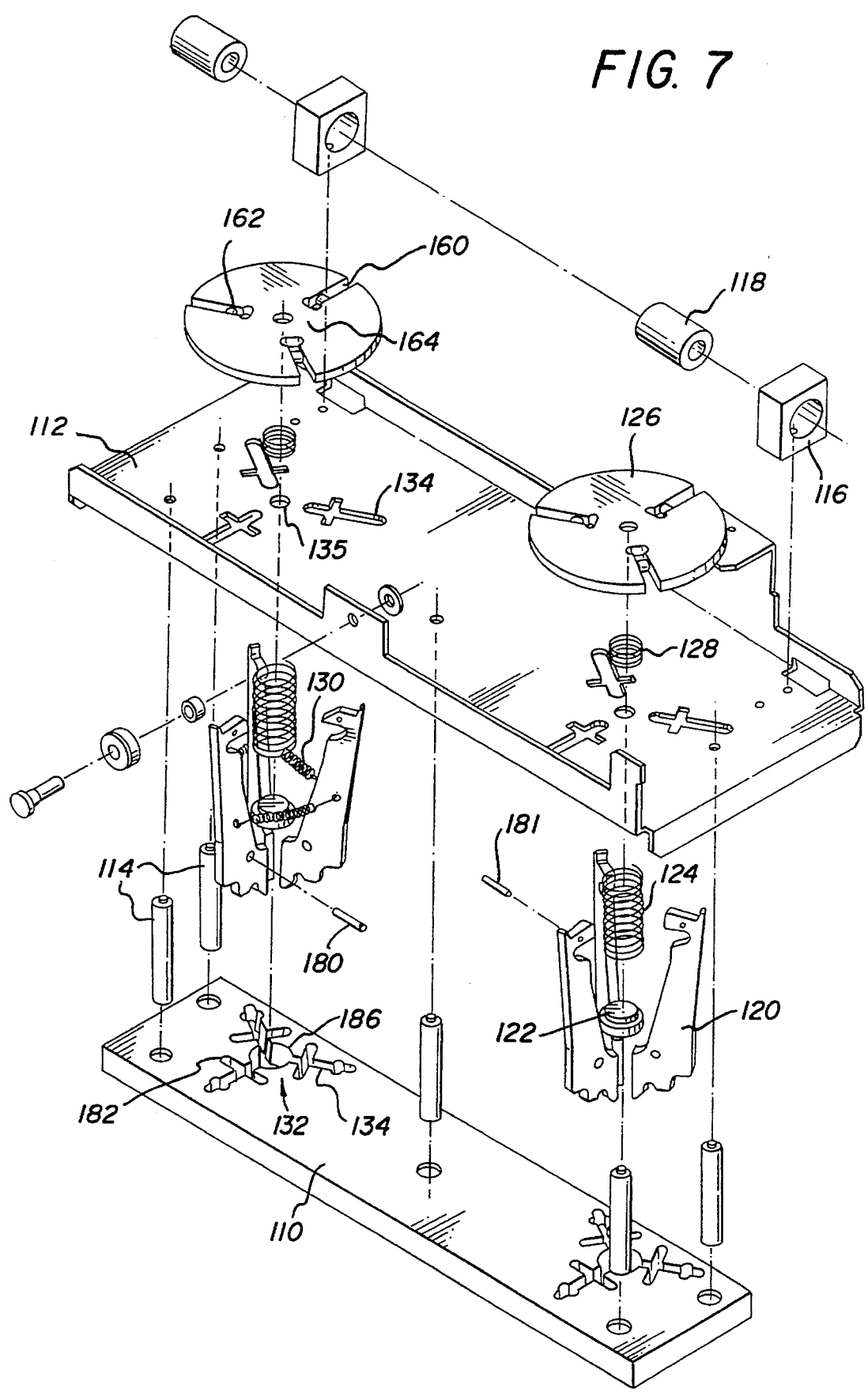
FIG. 7 is an exploded view of the movable transport carriage of the carriage assembly illustrated in FIG. 6.
Figure 9:
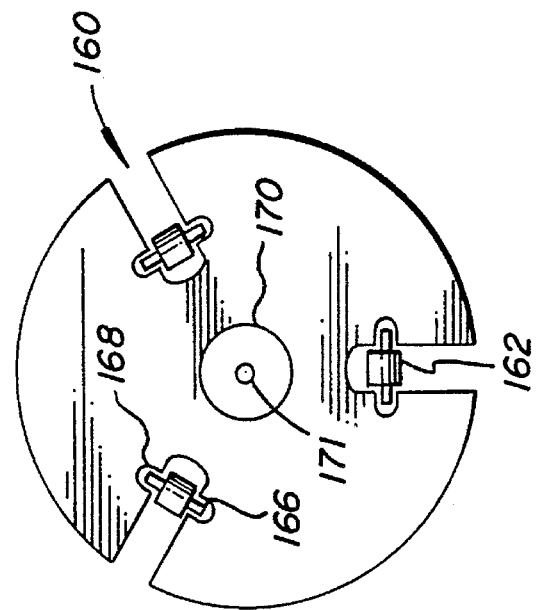
FIG. 9 illustrates a bottom surface of the stripper plate illustrated in FIG. 7.
Figure 8:
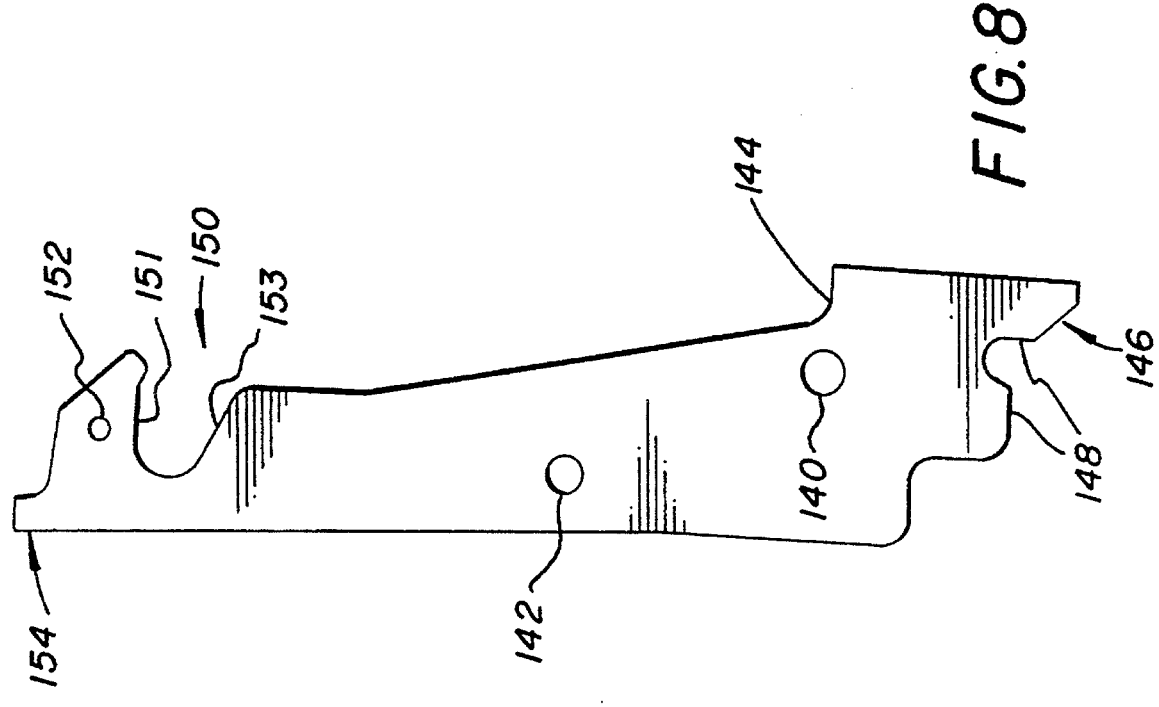
FIG. 8 illustrates a jaw blade used in the movable transport carriage assembly illustrated in FIG. 7.

As shown in the exploded view illustrated in FIG. 7, the movable transport carriage 90 includes a lower pivot plate 110 coupled to an upper frame member 112 by spacer supports 114. Two guide rod supports 116, including bushings 118, are attached to the upper frame member 112. The guide rod 92 illustrated in FIG. 6 passes through the guide rod supports 116 with sufficient clearance to permit the transport carriage 90 to move along the guide rod 92. Two floating jaw assemblies are also located on the transport carriage 90, with each jaw assembly including three jaw blades 120, a spring cap 122, a main spring 124, a stripper plate 126, a stripper plate spring 128 and preferably three garter springs 130 that are connected between the jaw blades 120. It should be noted that the garter springs 130 have been omitted from one of the jaw assemblies for purposes of clarification, but that both jaw assemblies preferably include the garter springs 130. The lower pivot plate 110 includes openings 132 through which a lower portion of the jaw blades 120 extend and the upper frame member 112 has slot openings 134 through which a top portion of the jaw blades 120 extend when assembled. As shown in FIG. 8, the jaw blades 120 include a pivot pin mounting hole 140, a garter spring mounting hole 142, a spring cap face 144, a disc locating surface 146, disc retaining surfaces 148, a roller slot 150, a retaining pin mounting hole 152 and a flag portion 154. The stripper plate 126 includes three slot openings 160 in which rollers 162 are mounted. A rubber solenoid striker surface 164 is also preferably recessed into the top surface of the stripper plate 126 (See FIG. 7). As shown in FIG. 9, which illustrates a bottom surface of the stripper plate 126, the rollers 162 are preferably mounted on axles 166 that are press fit into slots 168 provided in the bottom surface of the stripper plate 126. A spring retaining recess 170 is also provided in the bottom surface of the stripper plate 126 to hold the stripper plate spring 128 in position. A locator pin 171 also extends from the center of the retaining recess 170. The locator pin 171 passes through a locator hole 135 in the upper frame member 112 to center the stripper plate 126.

The movable transport carriage 90 is assembled by placing pivot pins 180 into the pivot pin mounting holes 140 of the jaw blades 120, and placing the jaw blades 120 into the openings 132 provided within the lower pivot plate 110. The openings 132 include pivot slots 182 that do not extend through the lower pivot plate 110. The pivot pins 180 rest within the pivot slots 182 and permit the jaw blades 120 to pivot within jaw blade slots 184 of the openings 132 which do extend through the lower pivot plate 110. The pivot slots 182 also permit the jaw blades 120 to float or move upward, as the pivot pins 180 are not fixed within the pivot slots 182. The spring caps 122 are placed within central portions 186 of the openings 132 which—like the pivot slots 182—do not extend through the lower pivot plate 110, but extend to a depth sufficient to permit the spring caps 122 to come into contact with the spring cap faces 144 of the jaw blades 120. The main springs 124 are placed into contact with the spring caps 122 and the bottom surface of the upper frame member 112, preferably around the bottom of a guide bushing (not shown) provided in the upper frame member 112 to receive the locator pin 171 of the stripper plate 120. The top portions of the jaw blades 120 extend through the slot openings 134 provided in the upper frame member 112, and are positioned within the slot openings 160 of the stripper plates 120 so that the rollers 162 of the stripper plates 120 are located within the roller slots 150 of the jaw blades 120. The stripper plate spring 128 is located between the top surface of the upper frame member 112 and the recess 170 formed in the bottom of the stripper plate 120, to apply an upward force on the stripper plate 120 such that the rollers 160 are preferably registered against a top surface 151 of the roller slots 150. Retaining pins 181 are placed within the retaining pin mounting holes 152 of the jaw blades 120.

Figure 11:
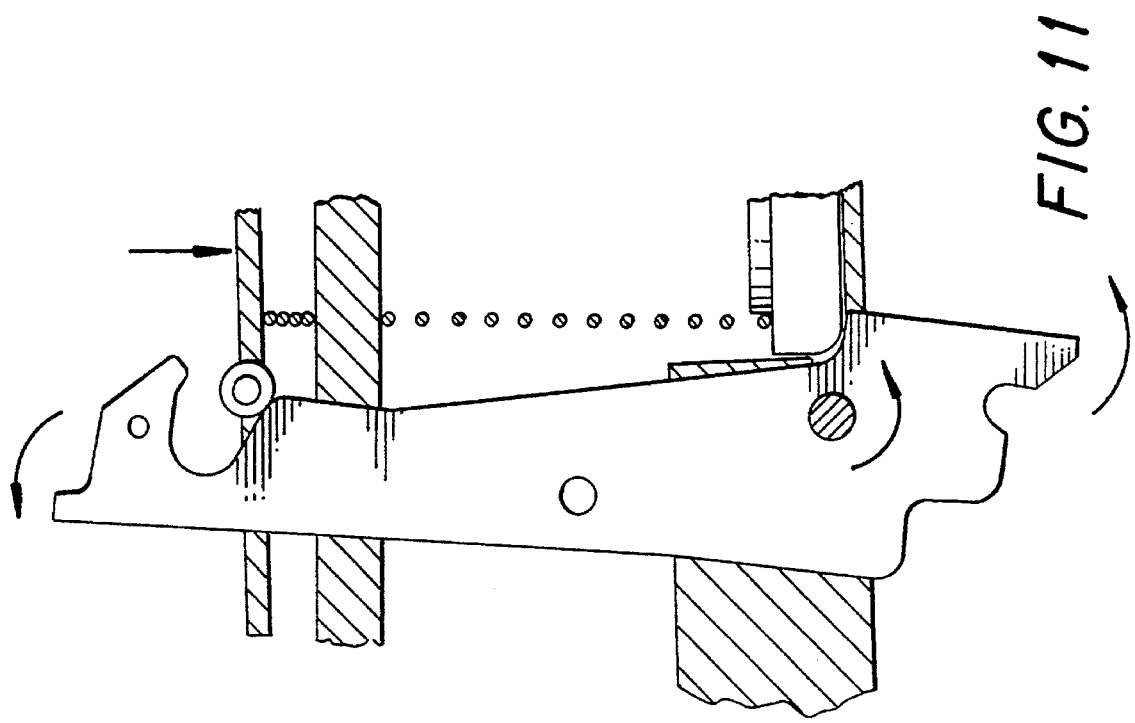
FIG. 11 is a cross-sectional view taken along the line a—a in FIG. 7 showing the location of a jaw blade in a release position.
Figure 10:
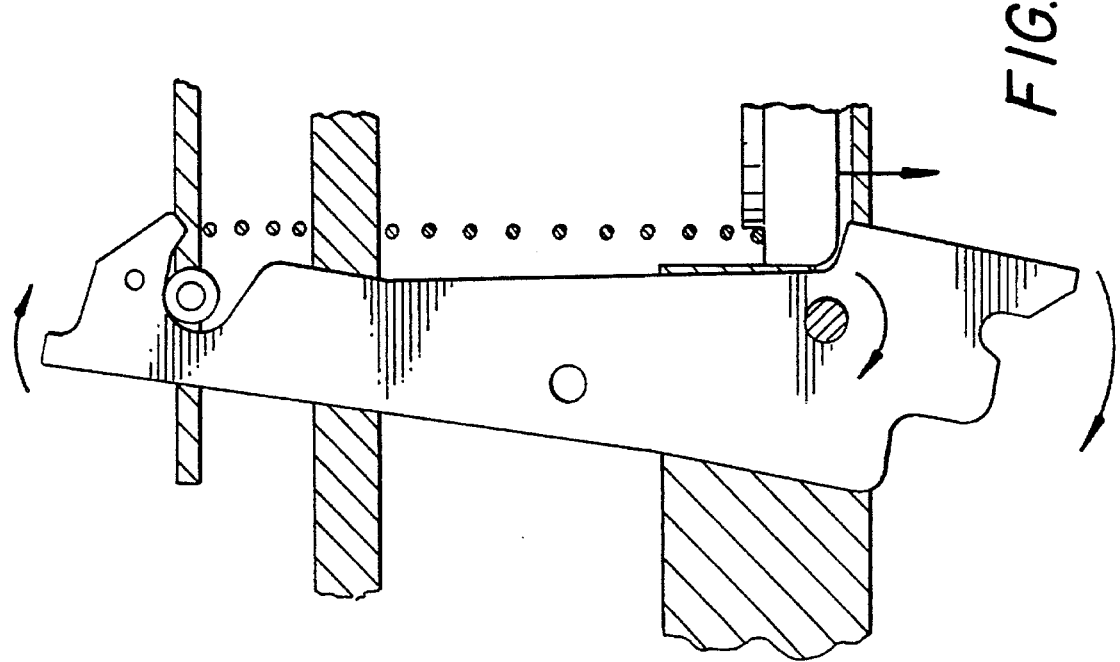
FIG. 10 is a cross-sectional view taken along the line a—a in FIG. 7 showing the location of a jaw blade in a latch position.

The main springs 124 exert a force on the spring caps 122, which in turn exert a force on the spring cap faces 144 of the jaw blades 120 that causes the bottom portions of the jaw blades 120 to pivot outward as shown in FIG. 10. As the jaw blades 120 pivot outward, a CD can be clamped against the disc retaining surface 148 of the jaw blades 120. In order to release a CD, a force is exerted against the solenoid striker surface 164 to cause the stripper plate 126 to move downward. As the stripper plate 126 moves downward, the rollers 162 roll along an inclined lower surface 153 of the roller slots 150, which causes the top portion the jaw blades 150 to move outward so that the bottom portions of the jaw blades 150 move inward as shown in FIG. 11.

The electronic controller assembly 24 includes a microcontroller (for example a Motorola 68HC11), random access memory (RAM), read only memory (ROM) and drive circuity for driving the elevator stepper motor 32, the plunger stepper motor 70, and the carriage drive stepper motor 80. The electronic controller assembly 24 preferably controls the various motors by utilizing ramp tables that are located in ROM. Each ramp table is preferably broken down into two sections: a step table that indicates how many steps are to be taken; and a rate table that indicates the rate at which the steps are to be taken as illustrated in Table 1.

TABLE 1

| Index | Step Table | Rate Table |
|-------|-----------|------------|
| 0 | 1 | 10 Steps/Sec. |
| 1 | 2 | 15 |
| 2 | 3 | 17 |
| 3 | 12 | 20 |
| 5 | 3 | 17 |
| 6 | 2 | 15 |
| 7 | 1 | 10 |

In the example illustrated above, a motor is driven by first taking 1 step at a rate of 10 steps/sec, then taking 2 steps at a rate of 15 steps/sec, etc. until the entire table has been indexed. In most cases, it is desirable to ramp the motor speed up, continue at full speed for a given period, and then ramp the motor speed down. Some operations, however, may require that the motors start and/or start at full speed. The use of the ROM tables to define the ramp function for each motor operation provides a great deal of flexibility in programming motor functions.

Figure 12:
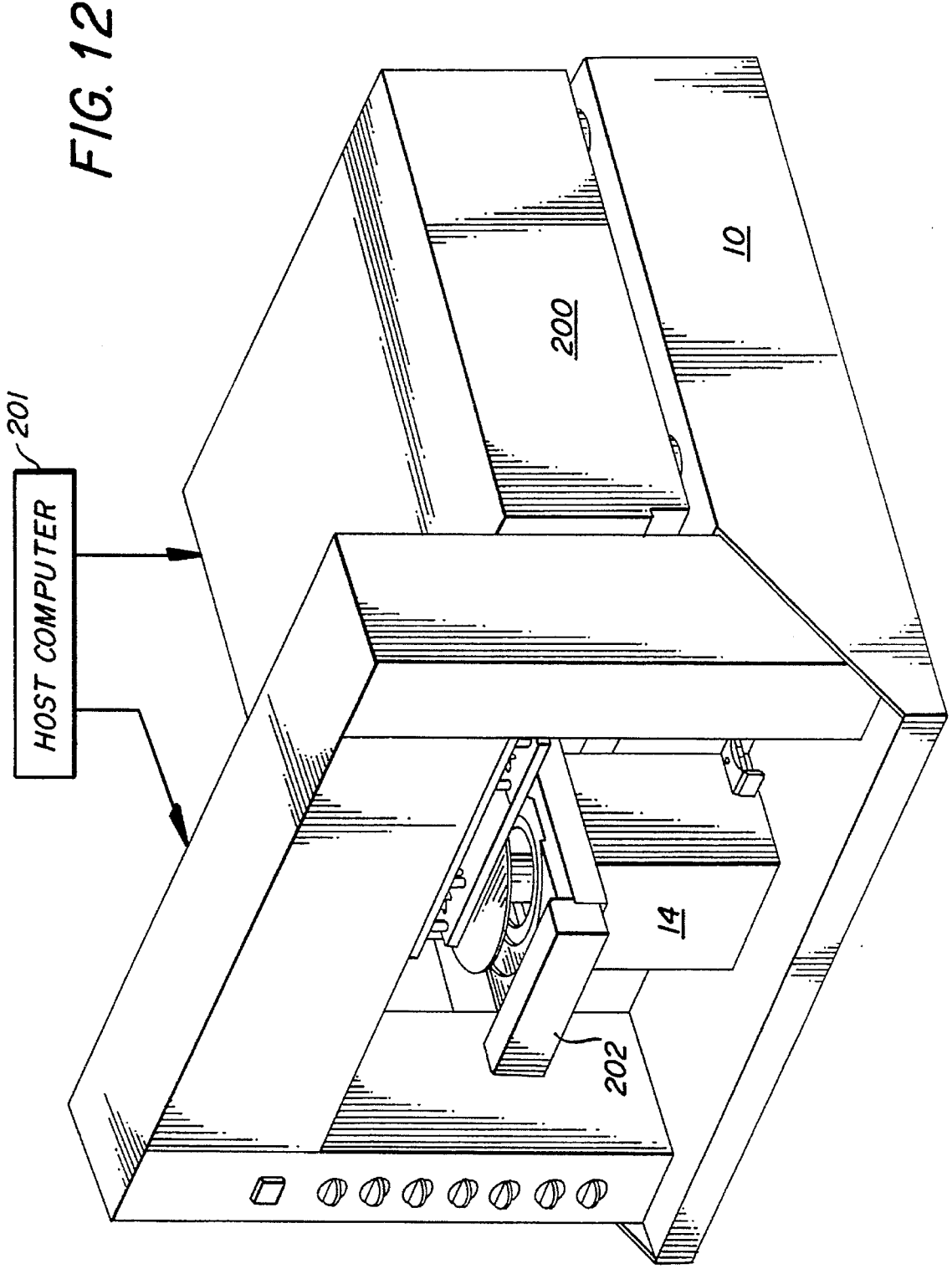
FIG. 12 is a perspective view illustrating the location of a CD write unit on the base unit illustrated in FIG. 1.

In operation, a CD write unit 200 is placed on the top surface 28 of the base unit 10 and aligned with the alignment pins 30 so that the CD drawer 202 of the CD write unit 202 opens over the plunger assembly 14 as shown in FIG. 12. A host computer 201 is electrically coupled to the CD write unit 200 through an interface, which enables the host computer 201 to send a command to the CD write unit 200 to cause the CD write unit 200 to open or close the CD drawer 202. The host computer 201 is also coupled to the electronic controller assembly 24 of the transport apparatus, which enables the host computer 201 to send a command to the electronic controller assembly 24 to initiate a transport operation.

The transport apparatus is initialized when a power switch located at the back of the base unit 10 is activated. Upon receiving power, the electronic controller assembly 24 commands the carriage drive motor 80 to move the transport carriage 90 all the way to the right (as viewed in FIG. 1) to a loading position, where one jaw assembly is located over the input magazine retainer 12 and the other jaw assembly is located over the plunger assembly 14. The electronic controller assembly 24 also commands the stepper motor 32 of the elevator assembly 20 to move the lift arm 34 to the home position, and commands the plunger stepper motor 70 to lower the rack assembly 74 to a home position.

Figure 13:
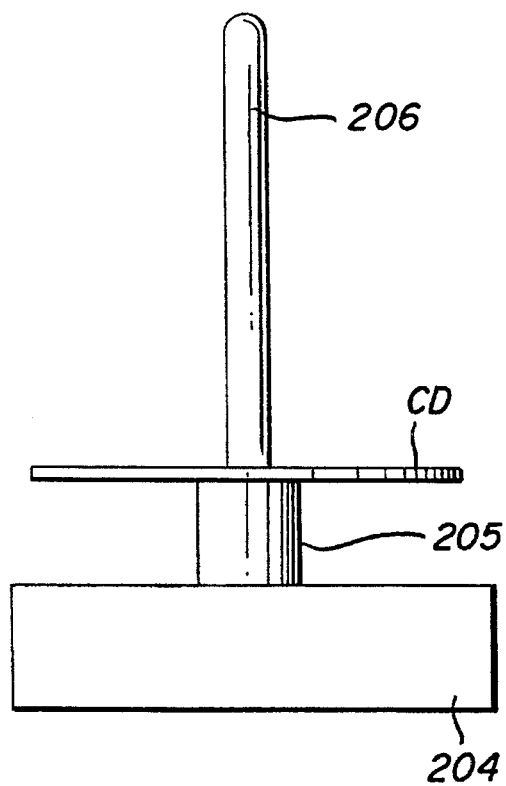
FIG. 13 illustrates a magazine for holding CD's.

An input magazine containing blank CD's is then loaded into the input magazine retainer 12 and an empty output magazine is loaded into the output magazine retainer 16. The input and output magazines or mandrels include a circular base unit 204 and a spindle 206 that extends from a central raised portion 205 of the circular base unit 204 as shown in FIG. 13, and are preferably capable of holding up to seventy-five CD's. The central raised portion 205 of the magazines fit between the recesses 58 in the frame members 52 and the recesses 56 in the locator clamps 50 of the magazine retainers. The electronic controller assembly 24 verifies that the input and output magazine retainers 12, 16 are locked in the correct position based on the signals received from the microswitches 61, and also checks to insure that the output magazine is empty based on the signal received from the magazine empty sensor 62. Warning signals are preferably generated and displayed on the operator interface 18 if the magazines are not properly locked or if the output magazine is not empty.

The user begins transport operations by pressing a start button on the operator interface 18 to send a start command to the electronic controller assembly 24. The electronic controller assembly 24, upon receipt of the start command signal, activates the input station solenoid 82. The input station solenoid 82 presses down on the solenoid striker surface 164 of the stripper plate 126 of the jaw assembly located over the input magazine, thereby causing the jaw blades 120 of the jaw assembly to pivot inward (FIG. 11). The electronic controller assembly 24 then commands the elevator assembly 20 to raise the lift arm 34. The lift arm 34 fits between the base unit 204 of the magazine and the lower most CD located thereon, when the magazine is loaded into the input magazine retainer 12. Thus, the raising of the lift arm 34 causes all of the CD's loaded on the input magazine to rise until the top most CD comes into contact with the jaw blades 120 of the jaw assembly. At this point, the jaw blades 120 of the jaw assembly are pushed upward, until the flag portion 154 of at least one jaw blade 120 blocks an optical sensor located in one of the sensor housings 96 adjacent to the input station solenoid 82, thereby causing a signal to be sent to the electronic controller assembly 24 indicating that the top most CD has come into contact with jaw blades 120.

The electronic controller assembly 24 then commands the elevator assembly 20 to lower the lift arm 34 to a ready position, where the top most CD is a fixed distance (preferably 0.875 inches) below the jaw blades 120, and deactivates the input station solenoid 82. The transport apparatus is then ready to receive a transport command from the host computer 201 to perform a transport operation.

The electronic controller assembly 24, upon receipt of the transport command signal from the host computer 201, again activates the input station solenoid 82 to cause the jaw blades 120 of the jaw assembly to pivot inward. The electronic controller assembly 24 then commands the elevator assembly 20 to raise the lift arm 34 the known fixed distance from the ready position to bring the top most CD into position to be captured by the jaw blades 120. The electronic controller assembly 24 then deactivates the input station solenoid 82, causing the jaw blades 120 to pivot outward and bringing the disc retaining surfaces 148 of the jaw blades 120 into contact with the top most CD. The electronic controller assembly 24 then commands the elevator assembly 20 to lower the lift arm 34 to the ready position, thereby leaving the top most CD retained or clamped by the jaw blades 120. A flag portion 154 of at least one jaw blade 120 preferably blocks an optical sensor located in the sensor housings 96 when a CD is clamped by the jaw blades 120. The optical sensor provides a signal to the electronic controller assembly 24 indicating that the top most CD has been successfully clamped.

Simultaneous with the above operation, the electronic controller assembly 24 activates the plunger station solenoid 84, causing the jaw blades 120 of the jaw assembly located thereunder to pivot inward, and commands the plunger stepper motor 70 to raise the rack assembly 74. If a CD were present in the drawer 202, the disc locator 76 would come in contact with the CD thereby raising the CD from the drawer 202 to a clamping position. In a manner similar to the clamping operation described above, the electronic controller 24 would then deactivate the plunger station solenoid 84 causing the CD that was raised from the drawer to be clamped by the jaw assembly. Of course, when operation is first initiated, a CD has not yet been loaded into the CD write unit 200. But in each operation after the first operation, a recorded CD will be present in the drawer 202.

In order to load the blank CD into the CD writer unit 200, the electronic controller assembly 24 sends a command to the carriage drive motor 80 to move the transport carriage 90 to the far left output position, wherein the jaw assembly clamping the blank CD is now located over the plunger assembly 14 and the other jaw assembly, which in each operation after the first operation is clamping a recorded CD, is located over the output magazine. The electronic controller assembly 24 then commands the plunger stepper motor 70 to raise the disc locator 76 to a "catch" position just below the clamped blank CD. Once the disc locator 76 is in position, the electronic controller assembly 74 activates the plunger station solenoid 84, which in turn presses on the stripper plate 126 of the jaw assembly holding the blank CD, thereby causing the jaw blades 120 of the jaw assembly to move inward and release the blank CD. The blank CD then falls onto the disc locator 76, which is then lowered until the blank CD is in the drawer 202 of the write unit. The host computer 201 then commands the CD write unit 200 to close the drawer 202 so a write operation can begin, wherein the data to be written to the CD is supplied to the CD write unit 200 by the host computer 201.

Figures 14, 14A:
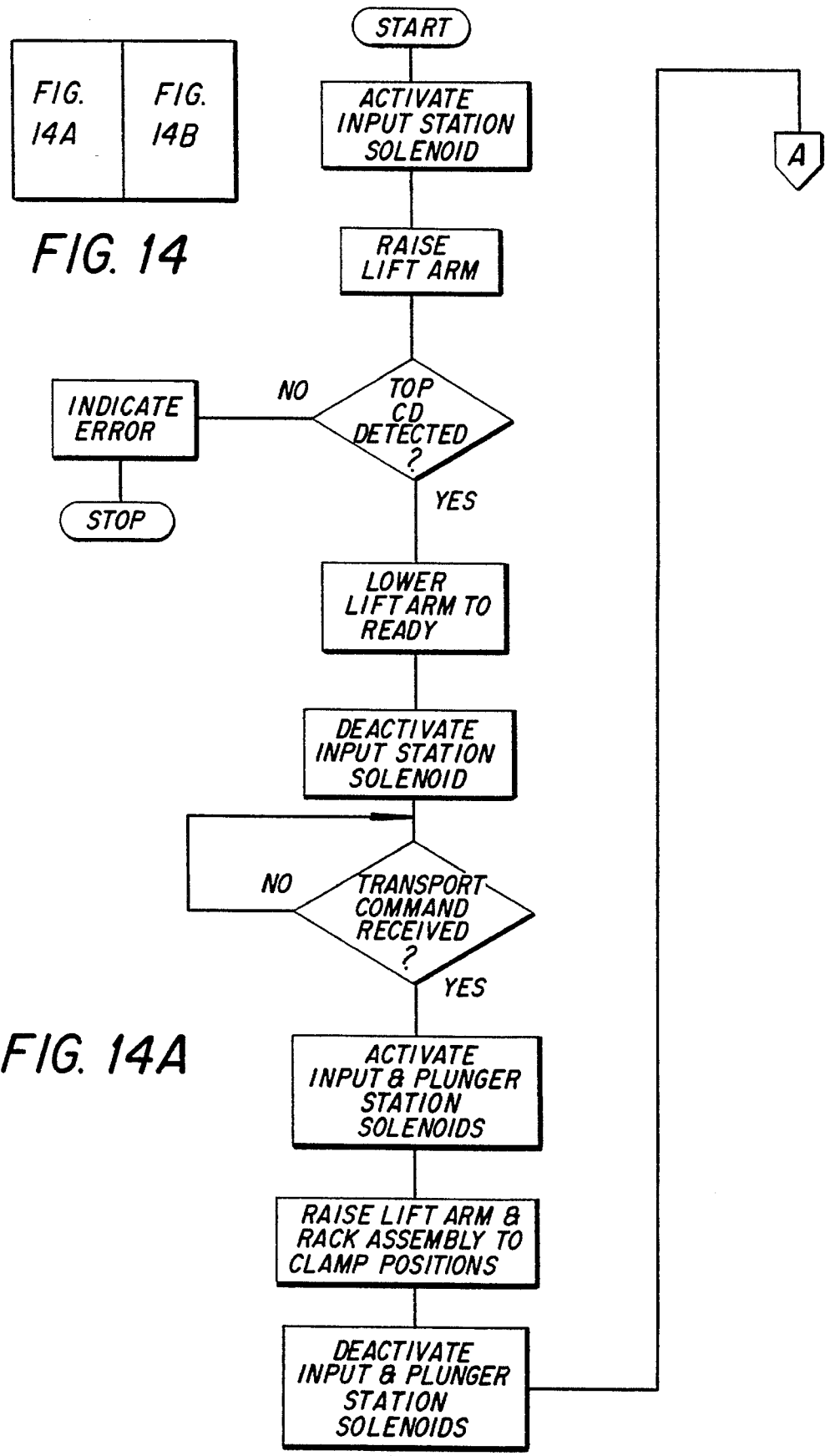
FIG. 14, 14A and 14B are a general flow diagram illustrating the operation of the apparatus shown in FIG. 12.
Figure 14B:
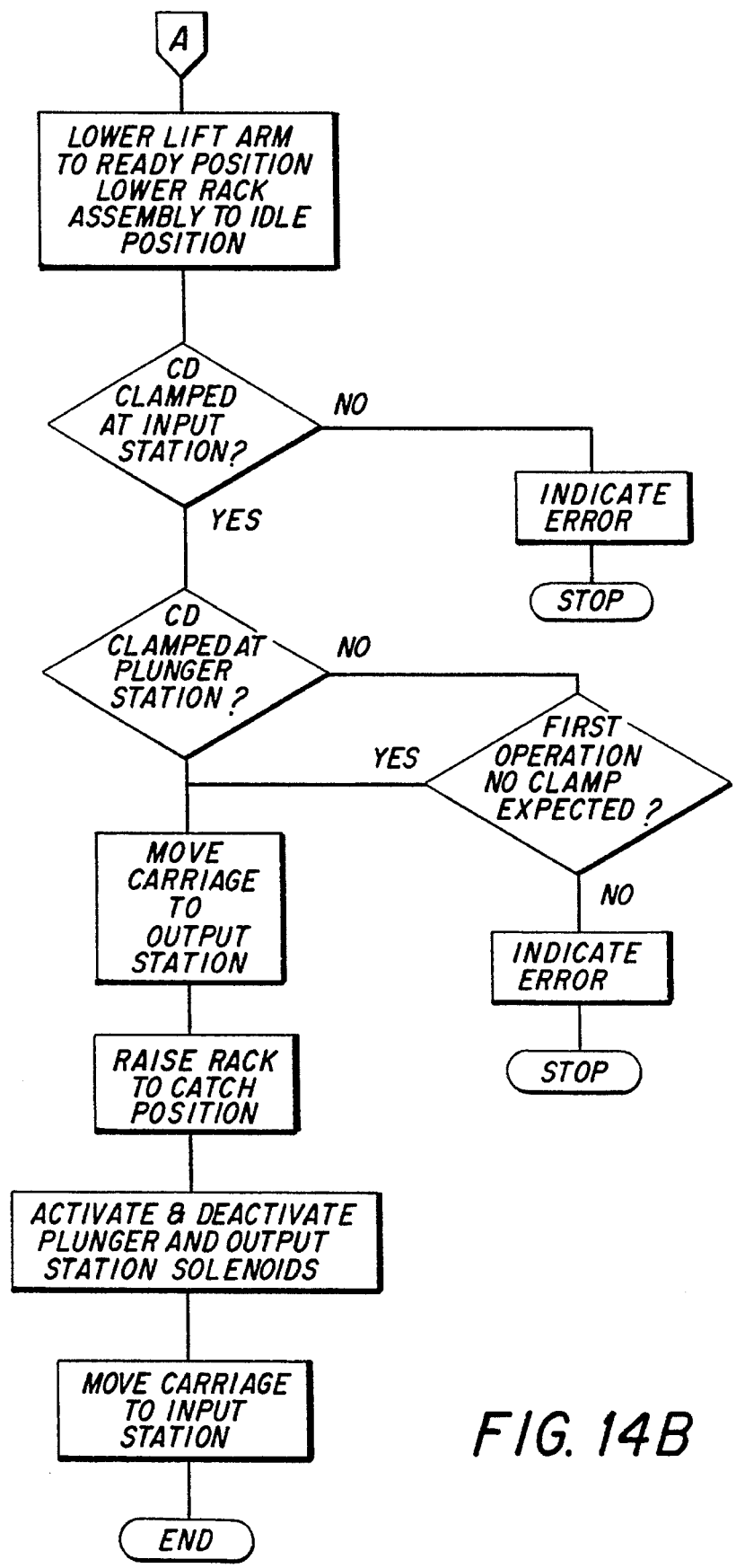

The output station solenoid 82 is activated simultaneously with the activation of the plunger station solenoid 84 during the above operation. The output station solenoid 82 presses on the stripper plate 126 of the jaw assembly now located over the output magazine. In all cases after the loading of the first blank CD, the jaw assembly located over the output magazine will have a recorded CD. Thus, the activation of the output station solenoid 82 causes the jaw blades 120 of the jaw assembly to move inward to release the recorded CD which falls onto the spindle 206 of the output magazine. The electronic controller assembly 24 then commands the carriage drive motor 80 to move the transport carriage 90 back to the loading position and the above process is repeated until all the CD's on the input magazine have been recorded and transferred to the output magazine. FIG. 14 is a basic flow diagram illustrating the operations described above.

The invention has been described with reference to certain preferred embodiments thereof. It will be understood, however, that modifications and variations are possible within the scope of the appended claims. For example, although the preferred embodiment employed two jaw assemblies, a single jaw assembly could be utilized. In such a case, the single jaw assembly would have to unload the drawer of the CD write unit prior to loading the next CD, which would reduce the speed at which CD's could be supplied to the CD write unit. Such an embodiment, however, may be desirable in applications requiring that the expense and complexity of the apparatus be reduced. In addition, the solenoids could be incorporated as part of the jaw assemblies, i.e. the solenoid would be located on the movable transport carriage instead of being fixed to the carriage assembly frame, in order to reduce the number of solenoids required. Further, different drive mechanisms can be readily employed to drive the lift arm and the transport carriage, and the pivot pins and/or the retaining pins can be formed integral with the jaw blade instead of being separate components. Still further, different sensor configurations can be utilized to sense the position of the top most CD and whether the jaw assemblies have successfully clamped a CD. For example, a sensor could be employed to sense the position of the stripper plate after a solenoid has been deactivated, instead of sensing the position of a flag located on the jaw blades.

INDUSTRIAL UTILITY

The invention is particularly useful in providing a disc transport mechanism that can be interfaced with a CD write unit, in order to load blank discs and unload recorded discs. The invention, however, is not limited to the specifically disclosed application, but can be utilized in any application requiring the movement of discs from one location to a second location including, for example, labeling, playing (reading) or inspection operations.

What is claimed is:

1. A jaw assembly for clamping an information disc, said jaw assembly comprising:

a lower pivot plate coupled to an upper frame member such that the lower pivot plate and the upper frame member are in parallel planes;

a plurality of jaw blades arranged on an axis between and perpendicular to the lower pivot plate and the frame member, the jaw blades being pivotally mounted in openings located in the lower pivot plate, wherein a plurality of lower portions of the jaw blades extend from the lower pivot plate and a plurality of upper portions of the jaw blades extend through openings provided in the upper frame member;

means for applying an outward pivoting force to the lower portions of the jaw blades for engaging a disc;

a disc locating surface contained on each of the jaw blades;

a disc retaining surface contained on an outside edge of each of the jaw blades structured to engage only one disc upon application of the outward pivoting force; and means for applying an inward pivoting force to the lower portions of the jaws blades to release discs engaged by the disc retaining surfaces, the means for applying an inward pivoting force further comprising a stripper plate having a plurality of rollers attached to the stripper plate such that there is at least one roller operatively connected to each of the jaw blades.

2. A jaw assembly for clamping a disc as claimed in claim 1, wherein the means for applying an outward pivoting force to the lower portions of the jaw blades comprises a main spring located between the jaw blades and the upper frame member.

3. A jaw assembly for clamping a disc as claimed in claim 2, wherein the means for applying an outward pivoting force to the lower portions of the jaw blades further comprises a spring cap located between the main spring and the jaw blades, wherein the spring cap contacts a spring cap face located on the jaw blades.

4. A jaw assembly for clamping a disc as claimed in claim 1, wherein the means for applying an inward pivoting force to the lower portions of the jaw blades further comprises the stripper plate having each roller located in one of a plurality of slot openings within the stripper plate, wherein the upper portions of each jaw blade are located within one of the slot openings within the stripper plate.

5. A jaw assembly for clamping a disc as claimed in claim 4, further comprising a stripper plate spring located between a top surface of the upper frame member and a bottom surface of the stripper plate.

6. A jaw assembly as claimed in claim 1, further comprising garter springs coupled between the jaw blades.

7. An apparatus for transporting discs comprising:

an input magazine retainer;

a plunger assembly located adjacent to the input magazine retainer;

an output magazine retainer located adjacent to the plunger assembly;

an elevator assembly located adjacent to the input magazine retainer;

a carriage assembly, including jaw assembly means for holding and releasing discs to be transported, located above the input magazine retainer, the plunger assembly and the output magazine retainer;

the jaw assembly means further comprising a plurality of jaw blades having a disc locating surface contained on a lower portion of each of the jaw blades and disc retaining means contained on the lower portion of the jaw blades, structured such that the disc locating surface will insert through a central aperture within discs to be transported and the disc retaining means structured for engaging only one disc upon an application of an outward pivoting force;

means for applying the outward pivoting force to a plurality of lower portions of the jaw assembly means for engaging a single disc;

means for applying an inward pivoting force to the lower portions of the jaw assembly means to release the single disc; and controller means for controlling cooperative operation of the plunger assembly, the elevator assembly and the carriage assembly to facilitate transportation of discs from the input magazine retainer to the output magazine retainer.

8. An apparatus for transporting discs as claimed in claim 7, wherein the carriage assembly includes a transport carriage comprising at least one jaw assembly, and means for moving the transport carriage between a first location above at least one of the input magazine retainer, the plunger assembly, and the output magazine retainer, and a second location above at least one of the input magazine retainer, the plunger assembly and the output magazine retainer.

9. An apparatus for transporting discs as claimed in claim 8, wherein the jaw assembly comprises: a lower pivot plate coupled to an upper frame member; at least three jaw blades pivotally mounted in openings located in the lower pivot plate, wherein lower portions of the jaw blades extend from the lower pivot plate and upper portions of the jaw blades extend through openings provided in the upper frame member;

the means for applying an outward pivoting force is applied to the lower portion of the jaw blades; and the means for applying an inward pivoting force is applied to the lower jaw blades is applied is applied as an outward force to an upper portion of the jaw blades.

10. An apparatus for transporting discs as claimed in claim 9, wherein the means for applying an outward pivoting force to the lower portions of the jaw blades comprises a main spring located between the jaw blades and the upper frame member.

11. An apparatus for transporting discs as claimed in claim 10, wherein the means for applying an outward pivoting force to the lower portion of the jaw blade further comprises a spring cap located between the main spring and the jaw blades, wherein the spring cap contacts a spring cap face located on the jaw blades.

12. An apparatus for transporting discs as claimed in claim 9, wherein the means for applying an inward pivoting force to the lower portion of the jaw blade comprises a stripper plate having at least three rollers, each roller being located in a slot opening within the stripper plate, wherein the upper portions of each jaw blade are located within the slot opening of the stripper plate, and the roller of each slot opening fits within a roller slot located in the upper portion of the jaw blade located in the slot opening.

13. An apparatus for transporting discs as claimed in claim 12, further comprising a stripper plate spring located between a top surface of the upper frame member and a bottom surface of the stripper plate.

14. An apparatus for transporting discs as claimed in claim 9, further comprising garter springs coupled between the jaw blades.

15. An apparatus for transporting discs as claimed in claim 7, wherein the controller means comprises a microcontroller and a memory, and wherein a plurality of motor ramp tables are stored in the memory, each of the motor ramp tables including a step table and a rate table.

16. An apparatus for transporting discs as claimed in claim 8, wherein the jaw assembly comprises a floating jaw assembly.

17. An apparatus for transporting discs as claimed in claim 9, wherein the controller means includes means for sensing the position of the jaw blades to determine when a disc is clamped by the jaw blades.

* * * * *